UNITED STATES PATENT OFFICE.

HARRY A. KENNEDY, OF CLEARFIELD, PENNSYLVANIA.

BASIC BRICK.

1,240,148.　　　　　Specification of Letters Patent.　　Patented Sept. 11, 1917.

No Drawing.　　　Application filed July 26, 1917.　Serial No. 182,995.

*To all whom it may concern:*

Be it known that I, HARRY A. KENNEDY, a citizen of the United States, residing at Clearfield, in the county of Clearfield and State of Pennsylvania, have invented certain new and useful Improvements in Basic Bricks, of which the following is a specification.

My invention relates to basic bricks and to the process of making the same.

The bricks are preferably made from a clinkered synthetically-made, nodulized, porous compound of lime, magnesia and fluxing agents, such as silica, alumina or oxid of iron. This material I prefer to make according to the method described in my application Serial No. 133,930, filed November 28, 1916, which method, briefly stated, consists in subjecting an intimate mixture of finely powdered calcium carbonate, magnesium carbonate and an oxid fluxing agent or agents, such as silica, alumina or iron oxid, in a rotary kiln to a high temperature and for such a period of time that a basic refractory clinkered compound is formed. These materials may be found in natural dolomite, but it is usually necessary to add sufficient oxid fluxing agents to insure the production of a clinker having the desired refractory characteristics.

I do not, however, limit my invention to any particular source from which the starting materials are derived, nor to this particular method of producing the basic refractory compound.

The bricks may be made by any of the well known methods of making fire brick, silica brick, or basic refractories, with this important difference, that a powerful pressure must be applied when pressing or squeezing the material from which the bricks are made into the shape desired. The pressure must be sufficient to squeeze out all, or nearly all the voids or air cells in the material referred to. If a sufficiently powerful pressure is not so applied, the shrinkage of the bricks when finally burned will be so considerable that they will either not hold together at all or be so drawn out of shape as to be undesirable for the purposes for which finished bricks are used.

The bricks may be burned in any of the well known ways of burning fire brick, silica brick or basic refractories, care being used in the setting of the raw bricks in the kilns so that too much weight is not piled on any individual brick, as it is necessary to heat the bricks to such a degree that the particles thereof become pasty or semi-fluid and are properly knitted or fritted together into a more or less compact and homogeneous body.

The amount of pressure required to press the bricks to the shape desired will depend upon the purpose for which they are to be used. In some cases, a denser finished brick is wanted, while for other uses a brick having greater porosity gives better service, the same as in all refractories. But in all cases, as before stated, the pressure must be such that the shrinkage in final burning will not be great enough to pull the bricks out of shape.

The bricks made according to my invention will, when finished, have approximately the following analysis:—Calcium and magnesium oxids, seventy-eight to ninety-two (78–92) per cent.; silica, two to thirteen (2–13) per cent.; and iron oxid and alumina, six to fourteen (6–14) per cent.

When the material produced according to the process described in my application above referred to is used, the bricks are made from the material directly as it comes from the machine which granulates the clinker, this granular material varying in size from fine sand to granules of about one-quarter inch in diameter. This granular material is mixed with about five (5) per cent. of water and molded into shape in a brick-making machine capable of applying a high pressure.

For the purpose of a temporary bond for the raw material for compressing into the shape desired and before the final burning, I use the well known water bond, about five (5) per cent. or as little as is necessary to make the material adhere solidly together, so as to withstand the handling and drying in the well known process of being made ready for setting in the kiln. Almost any material may be used for this purpose of a temporary bond that will cause the material to hold together until the final bond is made by burning the bricks at a very high temperature, for example, 2900° to 3200° F., which temperature is maintained for a sufficient length of time to bring the individual particles to a pasty or semi-fluid state, and permanently knit or frit them together.

For the final burning in kilns, any of the well known fuels now in use may be employed as long as the requisite temperature is obtained, or powdered coal may be used, care being taken that the baffle or flash wall employed be such as to prevent any excessive contamination of the bricks by the ash of the fuel.

The bricks herein described will be sufficiently stable or permanent for all basic refractory requirements, but should greater permanency be desired, this end may be accomplished by providing a vitrified or glazed outer surface as by spraying, washing or dipping the outer surface of the bricks before burning with any of the well known fluxing ingredients employed in the basic art, such as iron oxid, silica, alumina, etc., so that the outer skin in the final burning of the bricks will be vitrified or glazed by the high temperature employed.

I claim:

1. A refractory basic brick consisting of fritted together particles, each consisting of a compound formed of lime, magnesia, silica and an oxid fluxing agent.

2. A refractory basic brick consisting of fritted together particles, having the following analysis:—lime and magnesia, seventy-eight to ninety-two (78–92) per cent.; silica two to thirteen (2–13) per cent., and a fluxing agent.

3. A refractory basic brick consisting of fritted together particles, each consisting of a compound formed of lime, magnesia, silica and an oxid fluxing agent, said brick having a vitrified outer surface.

4. A refractory basic brick consisting of fritted together particles, having the following analysis:—lime and magnesia, seventy-eight to ninety-two (78–92) per cent.; silica two to thirteen (2–13) per cent., and a fluxing agent, said brick having a vitrified outer surface.

In testimony whereof I affix my signature.

HARRY A. KENNEDY.